Feb. 19, 1963   A. B. C. RANKIN   3,077,769
FLAW DETECTION SYSTEM USING SONIC AND ULTRASONIC WAVES
Filed Sept. 22, 1958   4 Sheets-Sheet 3

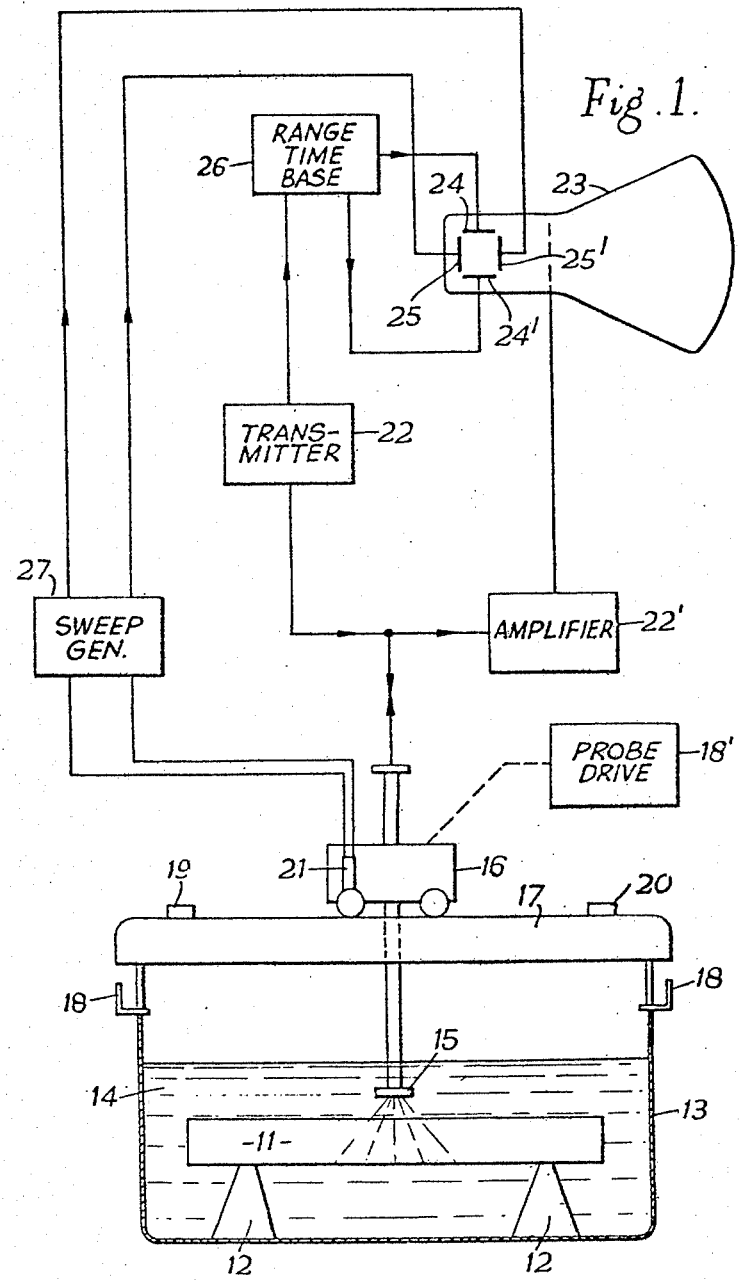

INVENTOR
ALEXANDER B. C. RANKIN
BY
Moore and Hall
ATTORNEY

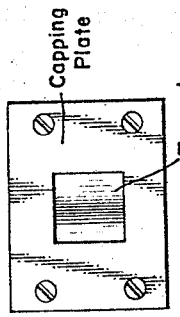
Fig. 7
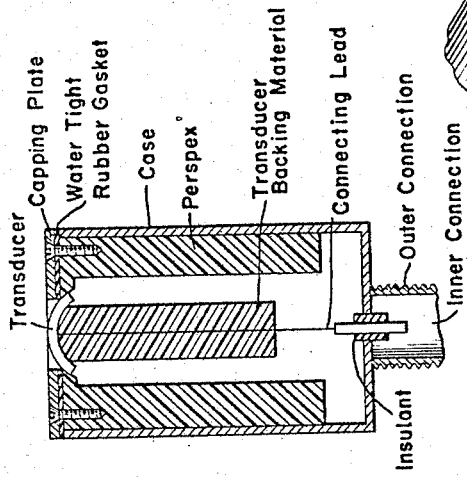
Fig. 6
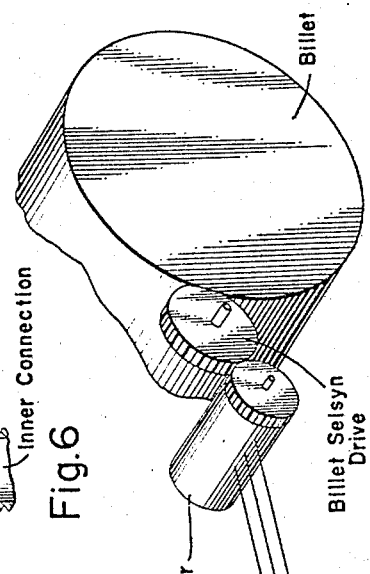
Fig. 8
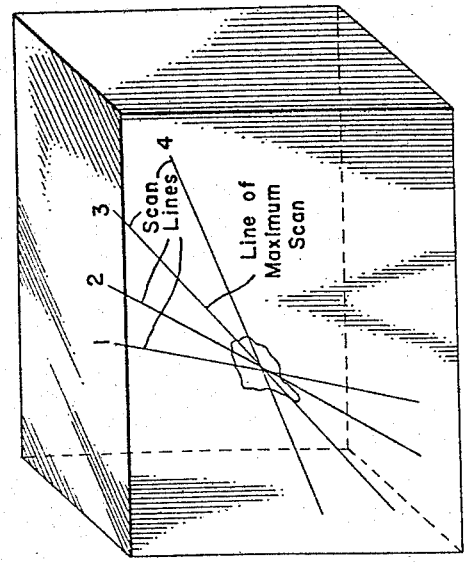
Fig. 5
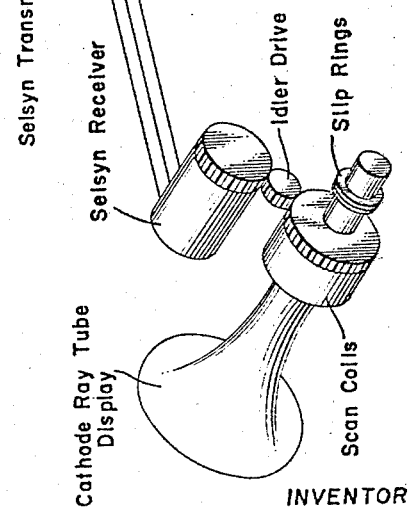
INVENTOR
Alexander B. C. Rankin

United States Patent Office 3,077,769
Patented Feb. 19, 1963

3,077,769
FLAW DETECTION SYSTEM USING SONIC AND ULTRASONIC WAVES
Alexander B. C. Rankin, Barkingside, England, assignor to S. Smith & Sons (England) Limited, London, England, a British company
Filed Sept. 22, 1958, Ser. No. 762,423
9 Claims. (Cl. 73—67.8)

The present invention relates to flaw detection using sonic or ultrasonic waves and has general application to echo-ranging systems.

In a known flaw detection system using pulsed ultrasonic waves a narrow beam of pulsed waves is directed into the material to be tested from a probe placed near a surface thereof and reflections of the pulsed waves from flaws in the material are received and applied to modulate a cathode ray oscilloscope to produce a vertical pip along a horizontal base line of the oscilloscope at a point representative of the distance of the probe from the flaw; the amplitude of the pip being representative of the amplitude of the reflection. The probe is moved to a position in which the amplitude of the pip is a maximum, and the assumption is made that in this position of the probe the beam axis passes through the flaw.

In order to increase the accuracy of flaw-positioning using this known system it has been generally accepted that it is necessary to increase the directivity of the ultrasonic beam. There are, however, practical limits to the accuracy of flaw positioning which can be achieved by increasing the directivity of the beam.

It is well known that an increase in angular directivity can be achieved either by decreasing the wavelength of the transmitted waves or by increasing the source diameter. The wavelength cannot, however, be decreased beyond a certain limit since scattering at grain boundaries becomes pronounced at high frequencies and limits the clarity of the results obtained and may prevent energy reaching the flaw. The amount of scattering depends upon the grain size and the elastic anisotropy of the material to be tested. For example, because wrought aluminum alloy is usually fine grained and comparatively isotropic, wavelengths as small as 0.25 mm. may be used. The use of such wavelengths would however, be unsatisfactory for testing steel particularly when the grain size is large, and wavelengths of about 2.4 mm. are generally used.

As regards increasing the source diameter, although this increases the angular directivity, it also increases the minimum cross-sectional area of the beam which is a disadvantage particularly at short ranges. For example, even at wavelengths of 0.24 mm. and using a 5 mm. diameter crystal giving a semi-angle of spread of only 2° the position of the flaw cannot be determined within 2.5 mm. unless the assumption is made that the reflection from the flaw will have maximum amplitude when the flaw lies on the beam axis. This assumption is, however, not always justified since flaw shape and orientation influence the characteristics of the echo.

Thus, there is a practical limit to the accuracy which can be obtained by increasing the directivity of the beam. Furthermore, the use of a highly directional beam introduces the danger of failing to detect certain types of flaws which are themselves directional reflectors and unfavourably orientated. In the case of a plane crack lying at an angle nearly parallel to the beam, the amplitude of reflection therefrom may be quite misleading.

It is one object of the present invention to provide an improved flaw detection system using pulsed ultrasonic waves, which does not depend for its accuracy on the use of a highly directive beam.

According to the present invention, there is provided a flaw detection system or like system using pulsed ultrasonic waves comprising wave generating and receiving means adapted to generate and transmit into a medium to be explored a divergent beam of pulsed ultrasonic waves and to receive waves reflected by discontinuities in the medium or by objects therein, means for producing relative movement between said divergent beam and the medium in a plane in which the beam is divergent and at least to some extent transverse to the beam, and a display or recording device adapted to provide a graphical representation the two coordinates of which represent respectively the said relative movement between the beam and the medium and the range of the target or discontinuity from the wave generating and receiving means.

In one embodiment of the invention, said relative movement is relative reciprocating movement in said plane in a direction perpendicular to the central axis of the divergent beam. The display device comprises a cathode ray oscilloscope, means responsive to said received waves to modulate the intensity of the electron beam of the oscilloscope in accordance with the amplitude of the received waves, means for deflecting the electron beam in one direction across the screen in synchronism with the relative movement between the divergent beam and the medium, and means rsepsonsive to said received waves to deflect the electron beam at instants related to the instants of transmission of pulses into said medium across the screen in a direction at right angles to said one direction.

A preferred form of the invention provides a probe as shown in FIGURES 6 and 7, having a special convex transducer in which the crystal is in the form of a part cylindrical shell of uniform thickness, the pulsed ultrasonic waves spreading radially from the convex surface of the shell through a semi-angle of about ten degrees, which gives a semi-angle in the medium of about forty-five degrees. This structure provides a beam which is divergent in one plane only. By the use of such a fan-shaped beam the desired directivity characteristics are obtained by suitable choice of the radius of curvature of the transducer and of the width of the segment without excessive disturbance of the signal to noise ratio. The effective source of noise in most metals is due to scatter from grain structure and the larger the wave front employed, the greater will be the scatter. The convex transducer provides the desired type of inspection beam and provides a reasonably uniform distribution of energy in the direction of propagation.

Some embodiments of the present invention will now be described by way of example with reference to the accompanying drawings in which:

FIGURE 1 is a block schematic diagram of an embodiment for exploring blocks of material of rectangular cross section for flaws and other defects, FIGURES 2a to 2d show different graphical representations obtained on the screen of the oscilloscope employed in the embodiment shown in FIGURE 1, FIGURE 3 is a schematic diagram illustrating a further embodiment of the invention, and FIGURES 4a to 4d show typical graphical representations obtained on the screen of an oscilloscope employed in the embodiment described with reference to FIGURE 3.

FIGURE 5 shows a test piece having a flaw, the scanning lines of the probe and their radial planar position.

FIGURE 6 is a sectional view of the probe.

FIGURE 7 is an end view of the probe of FIGURE 6.

FIGURE 8 is a diagrammatic view of a Selsyn system providing synchronized rotation of the oscilloscope beam and test object.

Figure 2A:
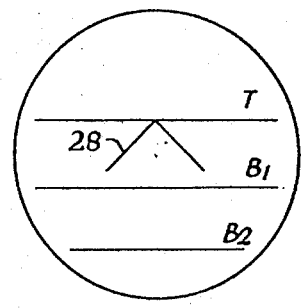

Referring first to FIGURE 1, a block 11 of rectangular cross section of a material to be explored for flaws is supported on trestles 12 in a tank 13 containing a liquid 14 such as water. A common transmitting and receiving probe 15, which is immersed in the liquid 14, is rigidly connected to a probe carriage 16 mounted on a track 17 extending across the tank 13. The track 17 is slidably mounted on parallel rails 18 so that it can be slid across the top of the tank 13 in a direction at right angles to the track 17.

The probe carriage 16 is arranged to be driven to and fro along the track 17 by a probe drive unit 18' incorporating a constant speed motor (not shown), reversal of the motor being obtained by operation of microswitches 19 and 20 when engaged by the carriage 16 at the end of its travel on the track 17. A wheel of the carriage 16 is arranged to drive the wiper of a potentiometer 21 to provide a variable resistance the magnitude of which is a measure of the distance which the carriage 16 has travelled from a predetermined point in the track.

The probe 15 is fed with pulsed ultrasonic electric signals from a transmitter 22 and is such as to generate and transmit pulsed ultrasonic waves through the liquid 14 and into the block 11 in the form of a plane divergent beam having a semi-angle of spread of 45° in a vertical plane parallel to the direction of motion of the carriage 16 along the track 17. A semi-angle of 45° in the metal is obtained with an angle of incidence of approximately 10°. The rays experience refraction at the surface of block 11 which increases the spread.

The electric pulses applied to the probe 15 from the transmitter 22 are also applied to an amplifier 22' together with echo pulses generated by the probe 15 from echoes received thereby. These echoes include an echo from the upper surface of the block 11, echoes from flaws, if any, present in the block 11, an echo from the lower surface of the block 11 and echoes resulting from multiple internal reflections within the block 11. The pulses applied to the amplifier 22' are amplified thereby and applied to the control grid of a cathode ray oscilloscope 23 to modulate the intensity of its electron beam.

The cathode ray oscilloscope 23 is provided with a pair of oscilloscope beam defletcion plates 24, 24' for deflecting the oscilloscope beam vertically and a second pair 25, 25' for deflecting the oscilloscope beam horizontally. A time base unit 26 under the control of the transmitter 22 is connected to the plates 24, 24' to provide a vertical deflection of the oscilloscope beam by a predetermined amount each time a pulse is transmitted to the probe 15 from the transmitter 22. A horizontal sweep generator 27 under the control of the potentiometer 21 is connected to the plates 25, 25' to provide a horizontal deflection of the oscilloscope beam. The arrangement is such that the oscilloscope beam is deflected across the screen in synchronism with the reciprocating motion of the carriage 16.

Figure 2B:
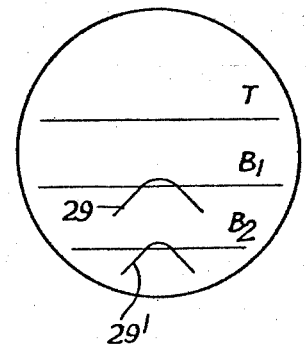
Figure 2C:
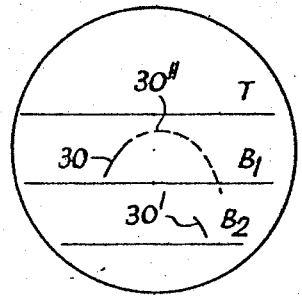
Figure 2D:
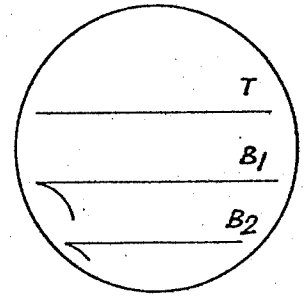

In operation, the probe drive 18' and transmitter 22 are switched on. The carriage 16 travels to and fro along the track 17 and pulses of ultrasonic waves in the form of the divergent beam are transmitted to the block 11. In the absence of any flaws in the block 11, only echoes from the upper and lower surfaces of the block 11 and multiple reflections of the bottom echo are received by the probe and transmitted to modulate the oscilloscope beam intensity. Such echoes produce horizontal lines on the oscilloscope screen, as shown in FIGURES 2a, 2b and 2c, line T being the line produced by the upper surface echo, line $B_1$ by the first bottom echo and line $B_2$ by the second bottom echo. The first bottom echo $B_1$ is a direct echo, the second bottom echo $B_2$ is an echo reflected from the top surface and then again from the bottom. There are third and fourth bottom echoes of decreasing strength which may or may not appear on the oscilloscope.

It will now be assumed that a small spherical flaw is present within the block 11. In this case, an echo from it is obtained when the leading edge of the divergent ultrasonic beam reaches it and this echo persists until the trailing edge of the ultrasonic beam leaves it. The distance of the probe 15 from the flaw, hereinafter referred to as the range $r$, progressively decreases as the probe 15 moves across the block 11, reaches a minimum when the probe is vertically above the flaw, and then increases as the probe moves away from the flaw.

For the purpose of explanation it will first be assumed that the probe 15 moves to and fro across the block 11 in contact with the upper surface thereof. In this case, if the depth of the flaw below the probe is $d$ and the horizontal distance between the vertical axis of the probe and the flaw is $x$, then $$r = \sqrt{x^2 + d^2}$$

and the minimum range is $r = d$ when $x = 0$.

A curve obeying this equation would therefore be traced out on the oscilloscope screen. The curve representing this equation is a hyperbola, its curvature depending upon the depth of the flaw. A spherical flaw near the upper surface would produce a trace as shown at 28 in FIGURE 2a. Such a trace would readily be detected. A spherical flaw close to the bottom surface would give rise to traces as shown at 29, 29', the trace 29' arising from a multiple internal reflection within the block 11. The main hyperbolic trace 29 starts and ends below the horizontal trace line $B_1$ produced by reflections from the bottom surface and could readily be detected.

Directional flaws such as angularly orientated cracks when encountered may give rise to strong reflections when the probe 15 is some distance away from the position of minimum range and no reflections at all when the position of minimum range is reached, as shown in FIGURE 5. In this case, only part of the hyperbola would be traced out on the oscilloscope screen and the minimum would be missing. Such a trace is shown in FIGURE 2c at 30 and that due to a multiple reflection at 30'. By extrapolation as indicated by the dotted line 30'', the position of the probe 15 at minimum range and the minimum range $d$ could readily be determined. Knowing the angle of the flaw from the probe axis together with the amplitude/angle variation characteristic of the probe used, the amplitude of the reflected waves as represented by the intensity of the oscilloscope beam can be utilised to determine the nature of the flaw. The characteristic of the trace will be essentially different from that of a spherical flaw, and a library of patterns for matching can be made to facilitate the identification of such flaws.

In the present embodiment, the probe 15 is moved to and fro across the block 11 at a fixed distance $h$ above the upper surface thereof. In this case, the relationship between the apparent range R and the lateral distance $x$ of the probe axis from the flaw is expressed by the following two equations:

$$R = h \frac{v_2}{v_1} \sec \theta_1 + d \sec \theta_2$$

$$X = h \tan \theta_1 + d \tan \theta_2$$

where $v_2$ is the velocity of propagation of the waves in the block 11,
$v_1$ is their velocity in the liquid 14,
$h$ is the height of the probe 15 above the surface of the material,
$\theta_1$ is the angle of incidence,
$\theta_2$ is the angle of refraction, and
$d$ is the depth of the flaw below the upper surface of the block 11.

It will be found that curves representing these equations are of the same general form as the hyperbola and that curves as shown in FIGURES 2a to 2d are traced out on the oscilloscope screen. For small values of $d$, the length of the trace is very short and as $d$ increases the length of the trace increases.

It is arranged that the time bases of the oscilloscope 23 can be expanded so that the whole of the oscilloscope screen may be utilised during observations and measurements. It should be remembered that markings on a cursor used for measurement are a function of $h$, which should therefore be standardised.

The same considerations apply when solid wedges or "schnozzles" are incorporated as part of the probe 15. In such cases, the values of $v_2$ and $v_1$ need to be adjusted when computing the curves.

In another embodiment of the invention, forward scanning is employed as in weld testing. Pulsed ultrasonic waves are directed into the material through, for example, a perspex block so shaped and arranged as to direct the beam along the length of the material to be tested. The beam is arranged to have the same characteristics as that employed in the first and second embodiments and the probe system including the perspex block is moved rapidly to and fro in the plane of the beam along the length of the material.

The relationship between range R and lateral distance X is the same as that hereinbefore set out except of course that $v_1$ becomes the velocity of wave propagation in perspex and $v_2$ the velocity of propagation in the material to be tested. It has been found that normally only one end of a hyperbolic flaw trace can be obtained since the value of X is inevitably high.

It has also been found that two or more reflections can be obtained from one flaw when forward scanning is employed, one of the reflections being a direct reflection from the flaw and the other being a reflection from the flaw in turn reflected by a boundary of the material. Traces produced by these reflections change in a different way, but with increasing range they tend to converge.

In weld testing, of course, examinations should be made from both sides of the weld, looking in opposite directions. If the probe conditions and distances are the same, the relationships between the two traces from any one flaw may also assist in identifying the nature of the flaw.

Figure 3:
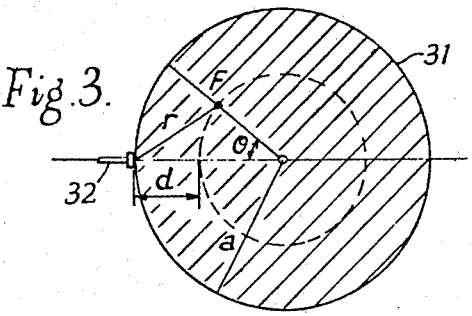
Figure 4A:
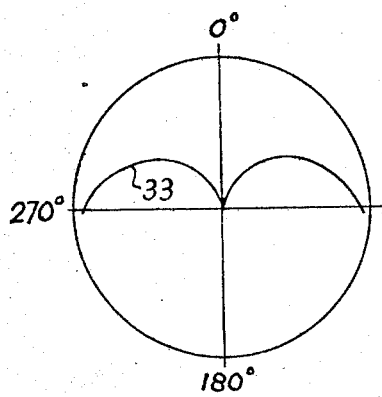
Figure 4B:
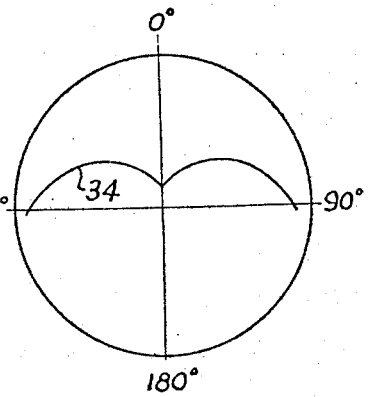
Figure 4C:
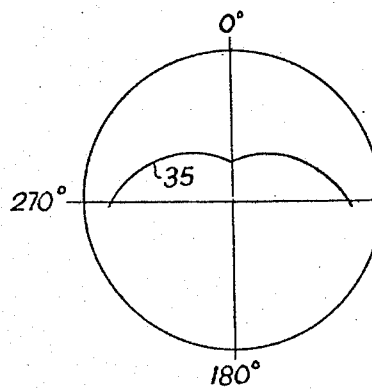
Figure 4D:
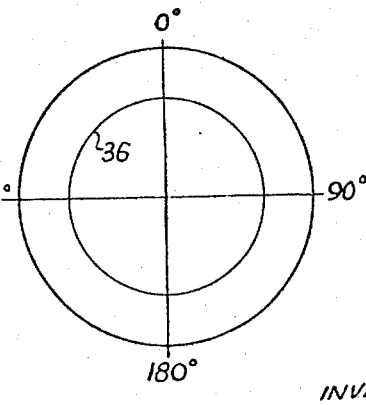

Referring now to FIGURE 3, in yet another embodiment of the invention, examination is made of a cylindrical body 31 by mounting the body for rotation about its longitudinal axis and fixedly mounting a common transmitting and receiving probe 32 in contact with the cylindrical surface of the body 31. The probe is fed with pulsed ultrasonic wave signals from a transmitter and is arranged to generate and transmit into the body pulsed ultrasonic waves in the form of a beam having a semi-angle of spread of about 45° in a plane perpendicular to the rotary axis of the body 11 and negligible spread at right angles thereto. A constant speed motor is provided for rotating the body at constant speed.

It can be shown that in this latter embodiment, the relationship of the instantaneous range $r$ and the angle $\theta$ between the probe axis and a radius drawn through a flaw F in the body 31 can be expressed as follows:

$$\frac{r}{a} = \sqrt{(1-n)^2 + 1 - 2(1-n)\cos\theta}$$

where $a$ is the radius of the cylindrical body 31 and $n$ is the ratio of the flaw depth $d$ below the surface to the radius $a$.

A graphical representation of the curve obeying this equation is produced on a cathode ray oscilloscope screen in a system of polar coordinates in which $r/a$ is the radius vector and $\theta$ is the angle between the radius vector and a horizontal line through the origin of the coordinate system. For this purpose, as shown in FIGURE 8, means are provided for rotating the oscilloscope beam in synchronism with the rotation of the body 31 and for radially deflecting the beam from an origin at the centre of the screen by a fixed amount each time a pulse is transmitted to the probe 32. The transmitted pulse together with flaw and boundary echo pulses developed in the probe 32 are amplified and applied to modulate the intensity of the oscilloscope beam. The oscilloscope beam traces out curves such as those shown at 33, 34, 35 and 36 in FIGURES 4a to 4d. The curve 33 is that produced by a spherical flaw which is at the surface of the body. Curve 34 is that produced by a spherical flaw at a depth $d$ below the surface of the body 31. As shown, a cusp is formed and the distance of the cusp from the origin on the screen is a measure of $$\frac{d}{a}$$

from which the value of $d$ can be obtained. Curve 35 is that produced by a flaw close to the centre of the body and curve 36, which is a circle, is produced by a flaw at the centre of the body.

Where testing is carried out from the inner surface of an annular body, similar curves may be obtained on the oscilloscope screen. In this case, the relationship between the range $r$ and the angle $\theta$ can be expressed as follows:

$$\frac{r}{a} = \sqrt{(n'+1)^2 + 1 - 2(n'+1)\cos\theta}$$

where $a'$ is the internal radius of the annular body, and $n'$ is the ratio of flaw depth $d$ from the inner surface to the internal radius $a'$.

It may be thought that the use of a fixed probe generating a wide beam results in a drop in sensitivity. If the beam is widened only in one plane the attenuation due to beam spread is not likely to be serious particularly in view of recent developments in the use of high power transmitters and barium titanate.

Various well known electronic devices may be used to ensure that the length of the visible pulses on the oscilloscope are as short as possible so that curves traced out are as fine as possible.

The probes 15 and 32 may be of conventional design with the exception that the crystal is in the form of a part cylindrical shell of uniform thickness, as shown in FIGURE 6, the pulsed ultrasonic waves spreading radially from the convex surface of the shell through a semi-angle of 45°.

While there has been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A flaw detection system using pulsed ultrasonic waves comprising wave generating and receiving means having a curved surface constructed to generate and transmit into a medium to be explored a <u>divergent beam</u> of pulsed ultrasonic waves and to receive waves reflected by flaws, said means comprising a transducer so shaped as to produce a beam substantially divergent in one plane only, means for producting relative movement between said divergent beam and the medium in the plane in which the beam is divergent and transverse to the beam, and a display device connected to provide a graphical representation of the two coordinates which represent respectively the said relative movement between the beam and the medium and the range of the flaw from the wave generating and receiving means.

2. A flaw detection system using pulsed ultrasonic waves comprising wave generating and receiving means constructed to generate and transmit into a medium to be explored a plane divergent beam of pulsed ultrasonic waves and to receive waves reflected by discontinuities in the medium and by objects therein, said means comprising a crystal in the form of a part-cylindrical shell of uniform thickness, means for producing relative movement between said beam and the medium in the plane of divergence of said plane divergent beam and transverse to the beam, and a display device connected to provide a graphical representation of the two coordinates which represent respectively the said relative movement between the beam and the medium and the range of the object or discontinuity from the wave generating and receiving means.

3. The combination set forth in claim 2, means to vary the intensity of the graphical representation in accordance with the amplitude of the received waves.

4. A system according to claim 2, wherein said relative movement is relative reciprocating movement in said plane in a direction perpendicular to the central axis of the divergent beam.

5. A system according to claim 2, wherein the display device comprises a cathode ray oscilloscope, means responsive to said received waves to modulate the intensity of the electron beam of the oscilloscope in accordance with the amplitude of the received waves, means for deflecting the electron beam in one direction across the screen in synchronism with the relative movement between the divergent beam and the medium, and means for deflecting the oscilloscope beam at instants related to the instants of transmission of pulses into said medium, in a direction at right angles to said one direction.

6. A system according to claim 5, wherein said medium is a rectangular body to be tested for flaws, wherein means are provided for reciprocating said wave generating and receiving means to and fro across a surface of the body.

7. A system as claimed in claim 2 in which said medium is a cylindrical body to be tested for flaws, said body being mounted for rotation about the longitudinal axis thereof and said wave generating and receiving means is arranged to transmit said plane divergent beam into said body in a plane at right angles to the longitudinal axis.

8. A system according to claim 7, wherein said display device comprises a cathode ray oscilloscope, means responsive to said received waves to modulate the intensity of the oscilloscope beam in accordance with the amplitude of the received waves, means for rotating the oscilloscope beam in synchronism with the rotating body, and means for deflecting the oscilloscope beam radially at instants related to the instants of transmission of pulses into said medium.

9. A flaw detection system, comprising in combination, transducer means having a curved surface comprising a crystal in the form of a part cylindrical shell of uniform thickness for generating and transmitting into a medium to be explored, a fan-shaped beam of pulsed ultrasonic waves, said beam having a substantial angular spread in one plane and a minimal spread in a plane normal to the first plane, means to scan said beam across a medium to be explored and display means connected to provide graphic representation in accordance with a selected set of coordinates of flaws detected in the medium being explored, to produce a distinctive indication on said display means representative of the precise location of a flaw in the medium being explored.

References Cited in the file of this patent

UNITED STATES PATENTS

| | | |
|---|---|---|
| 2,399,820 | Morgan | May 7, 1946 |
| 2,593,865 | Erdman | Apr. 22, 1952 |
| 2,740,289 | Van Valkenburg | Apr. 3, 1956 |

FOREIGN PATENTS

| | | |
|---|---|---|
| 696,920 | Great Britain | Sept. 9, 1953 |
| 726,824 | Great Britain | Mar. 23, 1955 |

OTHER REFERENCES

Pages 10 and 11 of book by B. Carlin entitled, Ultrasonics, pub. Apr. 8, 1949 by McGraw Hill Book Co. (Copy in Div. 36.)